United States Patent [19]
Idel

[11] 3,822,613
[45] July 9, 1974

[54] BANDSAW GRINDER

[76] Inventor: Vladimir Viktorovich Idel, ulitsa Gertsena, 3, kv. 37, Zavolzhie Gorkovskoi Oblasti, U.S.S.R.

[22] Filed: Aug. 2, 1972

[21] Appl. No.: 277,255

[30] Foreign Application Priority Data
Feb. 22, 1972 U.S.S.R. ............................ 1746566

[52] U.S. Cl. .................................................. 76/37
[51] Int. Cl. ............................................. B23d 63/08
[58] Field of Search ........................................ 76/37

[56] References Cited
UNITED STATES PATENTS
2,434,691  1/1948  Fields ..................................... 76/37
3,611,839  10/1971  Idel et al. .............................. 76/37

*Primary Examiner*—Harrison L. Hinson
*Attorney, Agent, or Firm*—Holman & Stern

[57] ABSTRACT

A band saw grinder comprising a flexible clamping device for holding the saw in a floating position and a device for braking the saw in the course of grinding.

2 Claims, 3 Drawing Figures

BANDSAW GRINDER

BACKGROUND OF THE INVENTION

The present invention relates to band saw grinders.

Known in the prior art are band saw grinders comprising a bed carrying a grinding head with a grinding wheel, mechanisms for feeding the saw towards the grinding wheel and along the saw pitch relative to the wheel. Besides, the grinders are provided with a device for holding the saw in the floating position. This device is installed on the carriage of the feed mechanism and comprises a flexible appliance for holding the side surfaces of the saw, a flexible appliance for holding the saw on its back surface, and supporting elements for the points of the saw teeth.

The device for holding the saw in the floating position comprises a body with a cover. The body and the cover are articulated to each other and loaded with a spring. The body and cover also accommodate an appliance for holding the side surfaces of the saw consisting of rolls facing each other and constituting guides for the movement of the saw.

The force of pulling the saw through the guide rolls is extremely difficult to adjust owing to a small force of friction. However, replacement of the guide rolls by flat guides is impracticable due to rapid wear of the latter, therefore smooth braking of the saw simultaneously with clamping its side surfaces is actually impossible. Braking of the saw must be adjusted for changing the amount of metal removed from the front and rear sides of the saw teeth during grinding.

SUMMARY OF THE INVENTION

An object of the present invention is to increase smoothness of saw braking while grinding its teeth.

Another object of the present invention is to improve the possibility of damping the nuisance vibrations of the saw blade.

In accordance with these and other objects of the invention there is provided a band saw grinder comprising a grinding head with a grinding wheel, mechanisms for feeding the saw towards the grinding wheel and longitudinally relative to the wheel and a flexible clamping device mounted on the feed mechanism carriage and intended to hold the saw in a floating position, which according to the invention, comprises a device for braking the saw, whose pressure element is in constant flexible contact with the side surface of the saw in the process of grinding its teeth.

It is preferable that the saw-braking device should be made in the form of a lever with a pressure element on its arm, the lever fulcrum being secured on the feed carriage while the constant flexible contact of the pressure element with the side surface of the saw is ensured by an adjustable spring located between said lever and said carriage.

Such an arrangement of the saw-braking device is simple and reliable in service.

The band saw grinder realized according to the present invention ensures smooth braking of the saw on changes in the amount of metal removed from the front and rear sides of the saw teeth which improves the surface finish of the ground teeth and increases the machining accuracy. Besides, the possibility of damping nuisance vibrations in the course of grinding is also increased.

BRIEF DESCRIPTION OF THE DRAWINGS

Now the invention will be described in detail by way of example with reference to the accompanying drawings, in which.

DETAILED DESCRIPTION OF PREFERRED EMBODIMENTS

Figure 1:
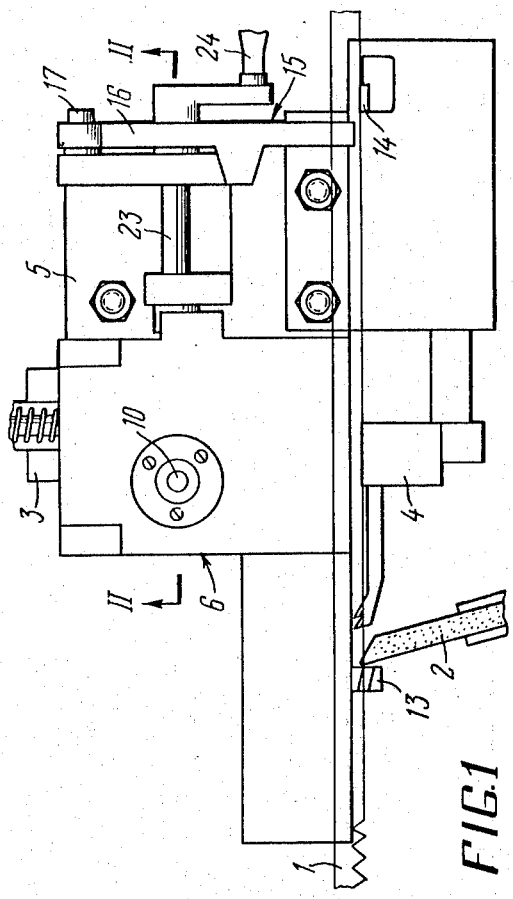
FIG. 1 is a top view of the band saw grinder according to the invention.

The band saw grinder 1 (FIG. 1) comprises a grinding head with a grinding wheel 2, a mechanism 3 for feeding the saw 1 towards the grinding wheel 2 and a mechanism 4 for feeding the saw 1 longitudinally relative to said grinding wheel.

Figure 2:
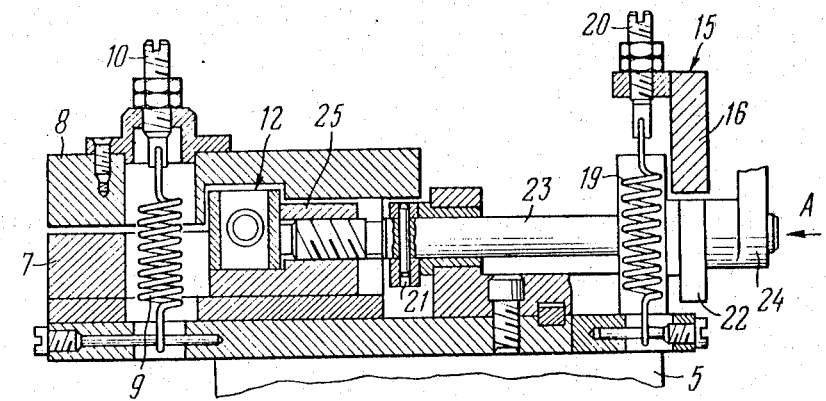
FIG. 2 is a section taken along line II—II in FIG. 1.

The carriage 5 which mounts the feed mechanisms 3 and 4 is provided with a device 6 for holding the saw in a floating position. This device comprises a body 7 (FIG. 2) closed by a cover 8. The body 7 and cover 8 are articulated to each other and loaded with a spring 9 one end of which is fastened in the body 7 while the other one is secured to the cover 8 by means of an adjusting bolt 10.

Figure 3:
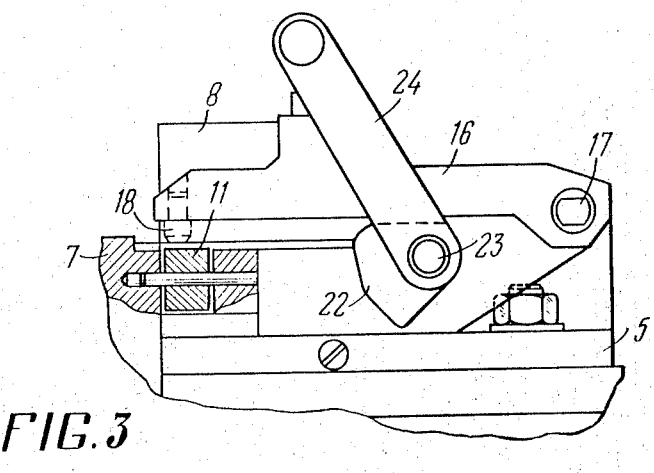
FIG. 3 is a view along arrow "A" in FIG. 2.

The body 7 accommodates an appliance 11 (FIG. 3) for holding the saw 1 on its side surfaces in the form of rollers installed in pairs in the body 7 and cover 8 and serving as guides for the saw 1. The same body accommodates an appliance 12 for holding the saw 1 at its back surface. The tooth points of the saw 1 rest on supporting elements 13 and 14 which are secured on the body 7 (FIG. 1).

The carriage 5 which mounts the feed mechanisms 3 and 4 is provided with a device 15 for braking the saw 1 in the course of grinding. This device consists of a lever 16 whose fulcrum 17 is secured on the carriage 5. The end of this lever carries a pressure element 18 which is in flexible contact with the side surface of the saw 1.

The flexible contact between the pressure element 18 and the side surface of the saw 1 is ensured by loading the lever 16 with a spring 19 one end of which is connected to the carriage 5 while the other end is linked to an adjusting bolt 20 connected with the lever 16.

While the saw 1 is being put on the rollers of the appliance 11, simultaneous turning of the cover 8 and lever 16 is ensured by the interaction of the lever 16 and cover 8 through eccentrics 21 and 22, respectively, the eccentrics being secured on an axle 23. One end of this axle carries a handle 24 while the other end is provided with a nut 25 which fixes the position of the appliance 12 for holding the saw 1 at the back side.

The device 15 for braking the saw 1 can also be installed on the other parts of the machine but the method of its location described above is the best.

The band saw grinder operates as follows.

Rotation of the handle 24 clockwise turns the axle 23 together with the eccentrics 21 and 22 which, acting respectively on the cover 8 and lever 16 lift them, stretching the springs 19 and 9. The saw 1 is placed on the rollers of the appliance 11 in the body 7 after which the handle 24 is turned counterclockwise thus pressing the springs 19 and 9 which lower the cover 8 and the lever 16 with the pressure element 18 on the side surface of the saw 1; simultaneously, the appliance 12 is locked by the nut 25. The rollers (not shown in the drawing) of the appliance in the cover press the saw against the rollers of the appliance 11 in the body 7 and press the pressure element 18 against the roller of the appliance 11 installed in the body 7.

After clamping the saw 1, the grinder drive (not shown in the drawing) is started and the saw starts moving over the rollers of the appliance 11. The pressure element 18 slides over the side surface of the saw 1, braking it owing to the sliding friction arising between the side surface of the saw 1 and the pressure element 18.

Braking of the saw allows smooth adjustment of the amount of metal removed from the tooth sides which improves the surface finish and machining accuracy of the saw teeth.

For grinding a saw 1 with a different stiffness, the tension of the spring 19 can be changed by means of an adjusting screw 20 which increases or reduces the force of the pressure element 18. The tension of the spring 19 can be adjusted in the course of grinding of the saw 1.

The nuisance vibrations of the saw 1 in the course of grinding are partly damped by the spring-loaded cover 8 and by the spring-loaded lever 16.

What is claimed is:

1. A band saw grinder comprising: a grinding head with a grinding wheel; an in-feed mechanism having driving means for feeding said saw towards said grinding wheel; a longitudinal saw pitch feed mechanism for feeding said saw relative to said wheel; a carriage supporting said in-feed mechanism; holding means for holding said saw in a floating position, said holding means being mounted on said carriage; saw-braking means mounted on said carriage at a predetermined distance from said holding means for braking the saw and acting in a direction opposite to the saw pitch feed direction, said saw-braking means having a pressure exerting member in constant flexible contact with the lateral surface of the saw during a grinding process.

2. A band saw grinder according to claim 1 wherein said saw-braking means consists of a lever whose arm carries said pressure exerting member and whose fulcrum is secured on the feed mechanism carriage and wherein an adjustable spring is installed between said lever and said carriage to ensure said constant flexible contact between said pressure exerting member and the side surface of the saw.

* * * * *